United States Patent [19]

Miller et al.

[11] Patent Number: 4,893,868
[45] Date of Patent: Jan. 16, 1990

[54] VEHICLE DOOR-TO-DOOR SUNROOF ASSEMBLY

[75] Inventors: William D. Miller, Troy, Mich.; Alain J. Clenet, Santa Barbara, Calif.; Charles P. Hines, Northville, Mich.

[73] Assignee: Cars & Concepts, Inc., Brighton, Mich.

[21] Appl. No.: 220,623

[22] Filed: Jul. 18, 1988

[51] Int. Cl.⁴ .............. B60J 7/047; B60J 7/06
[52] U.S. Cl. ................... 296/219; 296/220
[58] Field of Search .......... 296/219, 220, 216; 160/130

[56] References Cited

U.S. PATENT DOCUMENTS

| | | |
|---|---|---|
| 1,826,871 | 10/1931 | Ford . |
| 1,839,727 | 1/1932 | Austin . |
| 2,115,432 | 4/1938 | Simon . |
| 2,694,598 | 11/1954 | Ulrich .................. 296/107 |
| 2,861,836 | 11/1958 | Goeggel . |
| 2,947,570 | 8/1960 | Noe ..................... 296/117 |
| 3,658,378 | 4/1972 | Sutren . |
| 3,720,440 | 3/1973 | Podolan . |
| 3,993,348 | 11/1976 | Pizzuti . |
| 4,005,900 | 2/1977 | Rauthmann et al. . |
| 4,005,901 | 2/1977 | Lutke et al. . |
| 4,038,910 | 8/1977 | Kneusels et al. ......... 98/2.14 X |
| 4,043,590 | 8/1977 | Pizzuti . |
| 4,085,965 | 4/1978 | Schlapp ............... 98/2.14 X |
| 4,103,962 | 8/1978 | Schlapp . |
| 4,126,352 | 11/1978 | Vogel . |
| 4,157,845 | 6/1979 | Queveau . |
| 4,350,385 | 9/1982 | Schatzler .............. 296/222 |
| 4,403,805 | 9/1983 | Strem, Jr. et al. ........ 296/221 |
| 4,407,541 | 10/1983 | Boots ................. 296/216 |
| 4,426,112 | 1/1984 | Mori .................. 296/223 |
| 4,463,983 | 8/1984 | Hellriegel ............. 296/213 |
| 4,474,405 | 10/1984 | Kloppe et al. .......... 296/220 |
| 4,475,767 | 10/1984 | Grimm et al. .......... 296/221 |
| 4,523,785 | 6/1985 | Draper et al. ......... 296/224 |
| 4,541,665 | 9/1985 | Draper et al. ......... 296/218 |
| 4,695,090 | 9/1987 | Draper ............... 296/216 |

FOREIGN PATENT DOCUMENTS 328950  5/1930  United Kingdom ........... 296/219

*Primary Examiner*—Dennis H. Pedder
*Attorney, Agent, or Firm*—Brooks & Kushman

[57] ABSTRACT

A vehicle body sunroof assembly (30) for a roof opening (56) includes a sunroof (64) having a plurality of panels (66) that extend between upper edges of vehicle side doors (24) with a door-to-door construction. The sunfoor (64) also includes a flexible sheet-like cover (70) having connection (72) to the sunroof panels (66). The cover connections (72) to the panels (66) are spaced such that the cover is movable between a closed position where the panels are spaced from each other and an open position where the panels are positioned adjacent the rear edge of the roof opening in a partially overlapping relationship with the cover (70) stored therebetween in a folded condition.

13 Claims, 3 Drawing Sheets

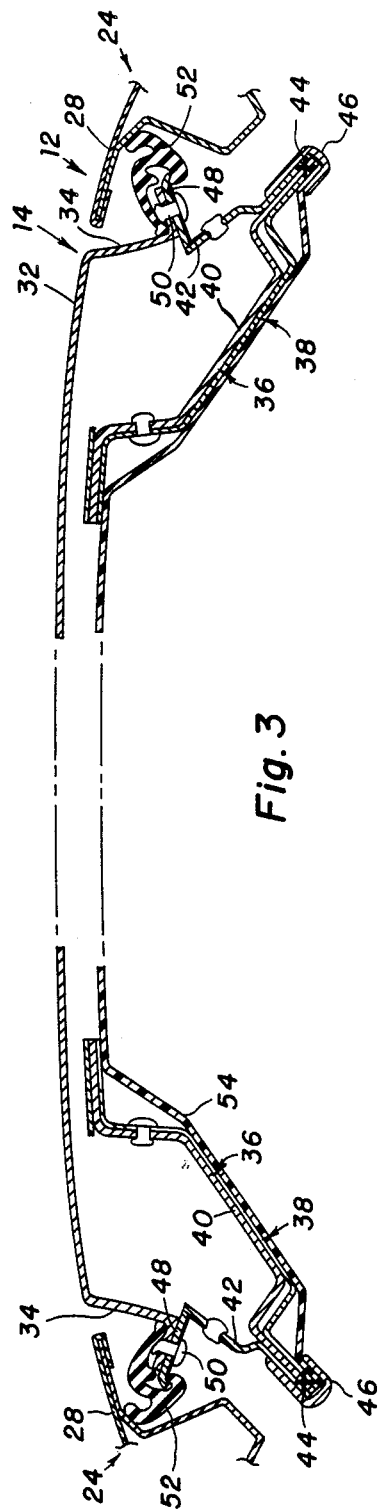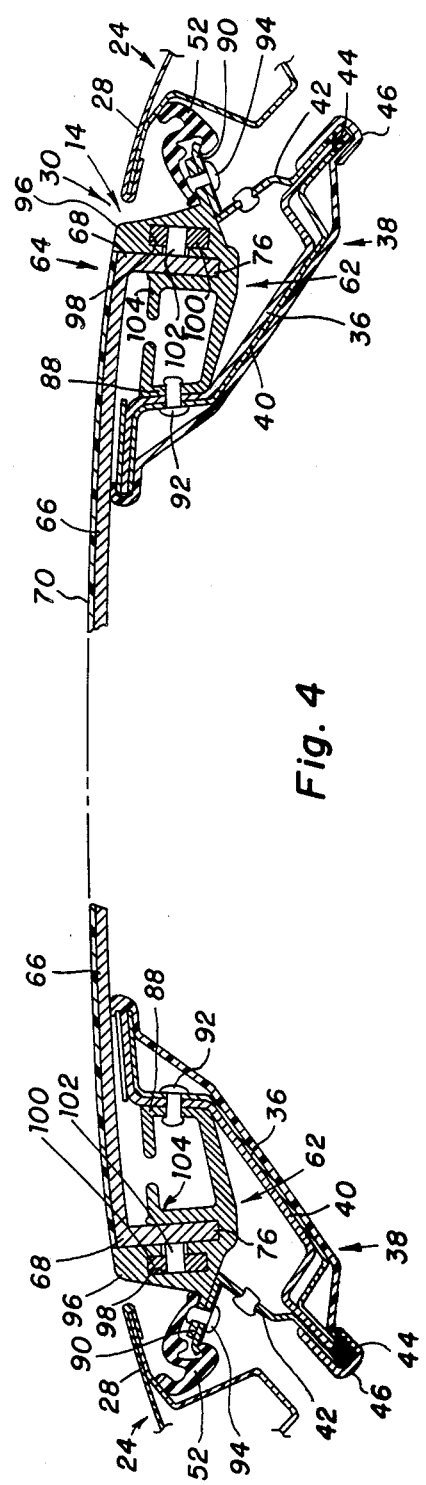

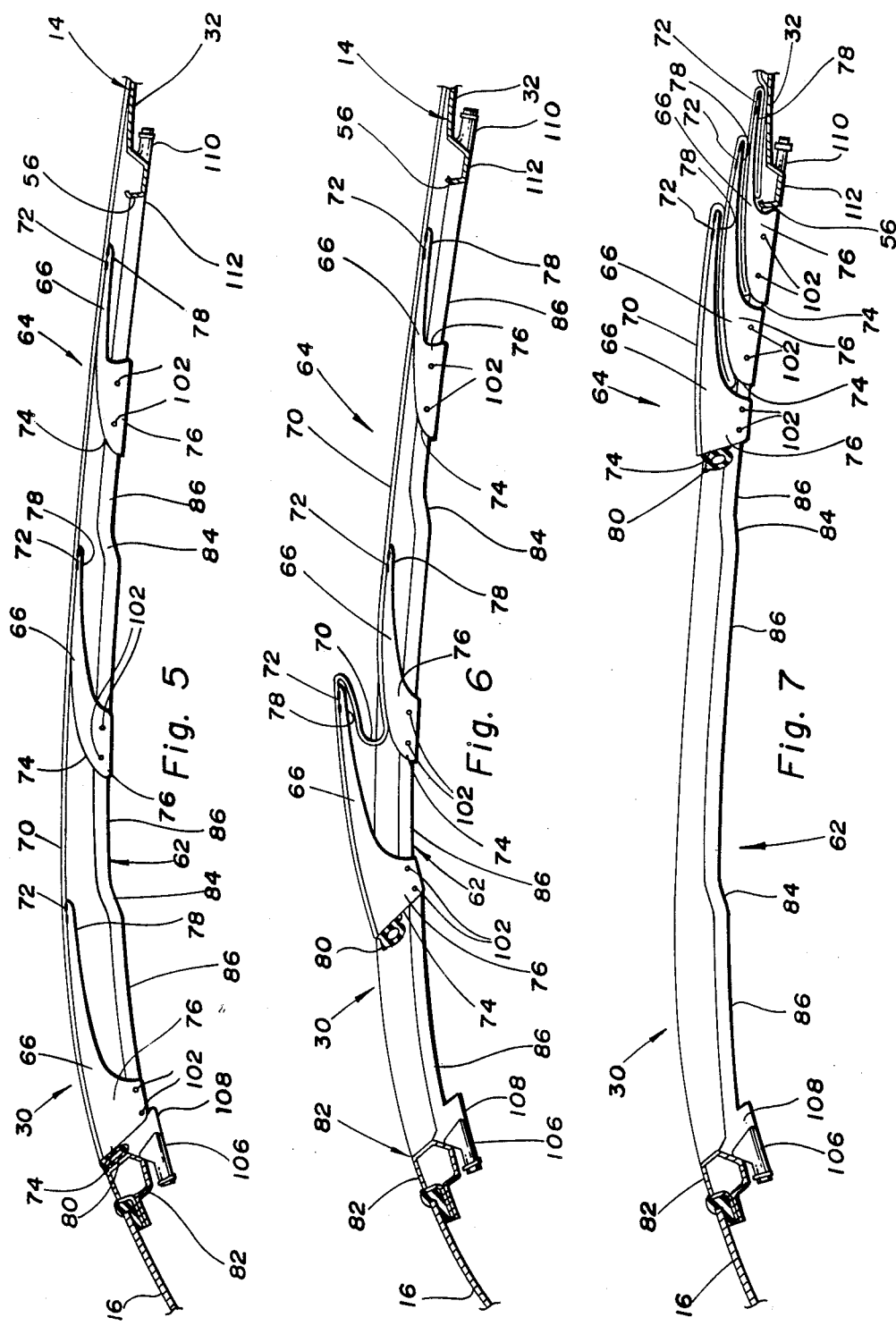

VEHICLE DOOR-TO-DOOR SUNROOF ASSEMBLY

TECHNICAL FIELD

This invention relates to a sunroof assembly for a vehicle body.

BACKGROUND ART

Vehicle body sunroof assemblies have been used for quite some time to provide partial opening of vehicle body roofs in order to increase ventilation and to also provide the roof with a somewhat convertiblelike capability of opening the vehicle occupant compartment. With some sunroof assemblies, the sunroof has a front edge that is secured to the roof and a rear edge that is movable upwardly from a closed position to an open position under the control of a latch mechanism. With other sunroof assemblies, the sunroof is mounted for longitudinal movement between a forward position closing the roof opening and a rearwardly retracted position below the roof to the rear of the roof opening such that the roof opening is partially opened to the environment. Examples of these two types of sunroof assemblies are disclosed by U.S. Pat. Nos. : 4,005,901; 4,038,910; 4,085,965; 4,103,962; 4,126,352; 4,350,385; 4,403,805; 4,523,785; and 4,541,665.

In some roof constructions, there is insufficient room for a sunroof assembly of the rearwardly retractably type to have its sunroof stored below the roof in the rearwardly retracted position. To overcome this problem, it has previously been proposed to have the sunroof stored externally at a location above the roof in the rearwardly retracted position. Examples of such externally retracted sunroof assemblies are disclosed by U.S. Pat. Nos.: 3,993,348; 4,005,900; 4,043,590; 4,407,541; 4,426,112; 4,463,983; and 4,475,767.

Vehicle sunroof assemblies as described above are conventionally mounted on a vehicle roof by cutting an opening through the outer roof panel over the front seat area that is selectively opened and closed by the sunroof. The lateral dimension of such sunroof assemblies is limited by the fact that the roof opening cut has to be located at each lateral side inboard from the adjacent side rail that defines the edge of the roof. Such side rails are conventionally defined by the adjacent side edge of the outer roof panel and by an inner rail that cooperates with the side edge to provide a hollow side rail for rigidifying the roof in order to provide the vehicle with structural integrity. The limitation on lateral width of sunroof assemblies is a particular problem with a recently introduced type of vehicle body wherein side door window frames have outer members that continue the contour of the outer roof panels at their side edges rather than being located below drip rails at the side edges of the roof. With this type of vehicle body construction, the side rails are located farther inboard than with the drip rail type of roof construction and there is thus less lateral space for the sunroof assembly to be mounted within an opening through the outer roof panel. An externally retractable sunroof assembly having a sunroof panel that extends between the doors is disclosed by U.S. Pat. No. 4,695,090.

In order to overcome storage problems associated with single panel vehicle sunroof assemblies, prior vehicles have included sunroof assemblies with multiple panels. See, for example U.S. Pat. Nos.: 1,826,871; 1,839,727; 2,115,432; 2,861,836; 4,157,845; and 4,474,405. However, such multiple panel sunroof assemblies require seals at the junctions of the panel in order to seal the vehicle occupant compartment from the environment.

Other vehicle body tops that can be opened in a convertible like manner have included a flexible cover associated with one or more panels or bows in order to provide sealing in the closed position. See, for example, U.S. Pat. Nos.: 2,947,570; 3,658,378; and 3,720,440.

DISCLOSURE OF INVENTION

An object of the present invention is to provide an improved vehicle sunroof assembly that extends between the upper edges of associated side doors and has multiple panels and a sheet-like cover that cooperate to selectively provide either closing of a roof opening between the side doors or opening thereof with the panels stored in a stacked relationship and the sheet-like cover folded between the panels.

In carrying out the above object, a vehicle body in which the sunroof assembly is incorporated includes an outer roof panel having side edges and also has inner rails that cooperate with the side edges of the outer roof panel to provide a pair of hollow side rails. The vehicle body also includes side doors having upper edges located adjacent the side edges of the outer roof panel. The sunroof assembly includes a roof opening formed in the outer roof panel with forward and rearward edges and with side edges exposing the interior of the side rails of the roof. A pair of tracks of the sunroof assembly are also provided with one of the tracks mounted within one of the side rails and with the other track mounted within the other side rail. The sunroof assembly also has a sunroof including a plurality of panels having elongated shapes extending laterally with respect to the vehicle body. Each panel has opposite ends one of which is mounted by one track in one of the side rails and the other of which is mounted by the other track in the other side rail. These tracks cooperate to support the panels for forward and rearward movement with respect to the vehicle body. The panel ends are juxtaposed with respect to the upper edges of the closed side doors to provide a continuous door-to-door construction. The sunroof also includes a flexible sheet-like cover that extends between the panels and has connections to the panels. These connections are spaced along the cover with greater spacings than the front-to-rear dimensions of the panels. The sunroof is movable between a closed position with respect to the roof opening where the panels are spaced from each other with the cover extending therebetween and an open position where the panels are positioned adjacent the rear edge of the roof opening in a partially overlapping relationship with the cover stored therebetween in a folded condition.

The sunroof assembly has the opposite ends of the sunroof panels each provided with a front side including a front support mounted by the associated track within the adjacent roof side rail. Each sunroof panel also includes a rear side that is located rearwardly of its track mounted front supports Each track of the sunroof assembly includes a plurality of inclined ramps and horizontally extending portions connecting the ramps. The number of ramps of each track is one less than the number of sunroof panels. Each ramp extends downwardly in a forward direction such that the rear side of each panel is moved upwardly as the front supports thereof move along the ramps to thereby facilitate the overlapping storage of the sunroof panels with the cover folded therebetween in the open position.

Each track in the preferred construction of the sunroof assembly has inboard and outboard flanges secured to the associated roof side rail. A track portion of each track is located laterally intermediate its inboard and outboard flanges. This track portion of each track preferably projects upwardly and has a track groove. Each opposite end of each sunroof panel has a support element of the support thereof received by the track portion groove of the associated track to provide mounting thereof on the track.

In the preferred sunroof assembly construction, each track portion has its groove provided with a horizontally opening configuration and each sunroof panel end has a downwardly projecting front support on which its support element is mounted. The support elements of the sunroof panels are preferably rollers that are received within the groove of the associated track portion in order to facilitate the panel movement. The groove of each track portion most preferably opens in an inboard direction with respect to the vehicle body with the associated panel support located inboard therefrom and supporting the roller that is received within the track groove. Each track also preferably includes an upwardly projecting guide that opposes the horizontally opening groove with the downwardly projecting front portion therebetween in a captured relationship.

In its preferred construction, the sunroof assembly also has each track provided with at least one water outlet through which rain and other moisture accumulation can drain. Each track preferably has at least one end at which its water outlet is located and most preferably has both front and rear ends that each have an associated water outlet for drainage of moisture.

The objects, features, and advantages of the present invention are readily apparent from the following detailed description of the best mode for carrying out the invention when taken in connection with the accompanying drawings.

BRIEF DESCRIPTION OF DRAWINGS

FIG. 3 is an elevational view taken laterally in section through a vehicle body prior to cutting of a roof or installation of the sunroof assembly of the present invention;

FIG. 4 is a sectional view similar to FIG. 3 taken after the installation of the sunroof assembly;

FIG. 5 is a longitudinal view taken partially in section along the direction of line 5—5 in FIG. 1 to illustrate the sunroof assembly in its closed position;

FIG. 6 is a partial sectional view taken along the direction of line 6—6 in FIG. 2 and illustrates the sunroof assembly in its partially open position; and FIG. 7 is a partial sectional view taken in the same direction as FIGS. 5 and 6 but illustrating the sunroof assembly in its open position.

BEST MODE FOR CARRYING OUT THE INVENTION

Figure 1:
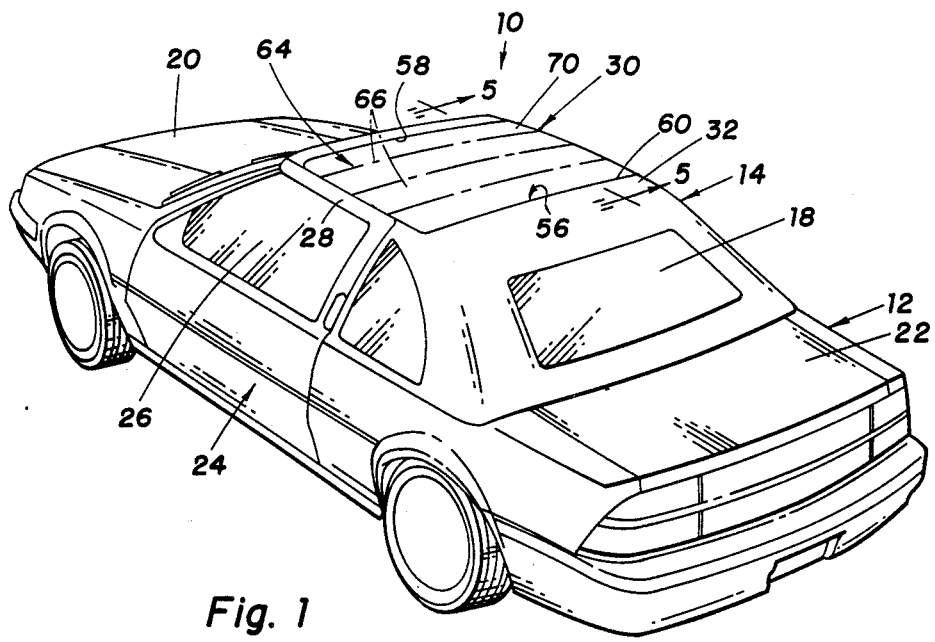
FIG. 1 is a perspective view of a vehicle whose vehicle body includes a door-to-door sunroof assembly constructed in accordance with the present invention and is illustrated with a sunroof thereof in a closed position.
Figure 2:
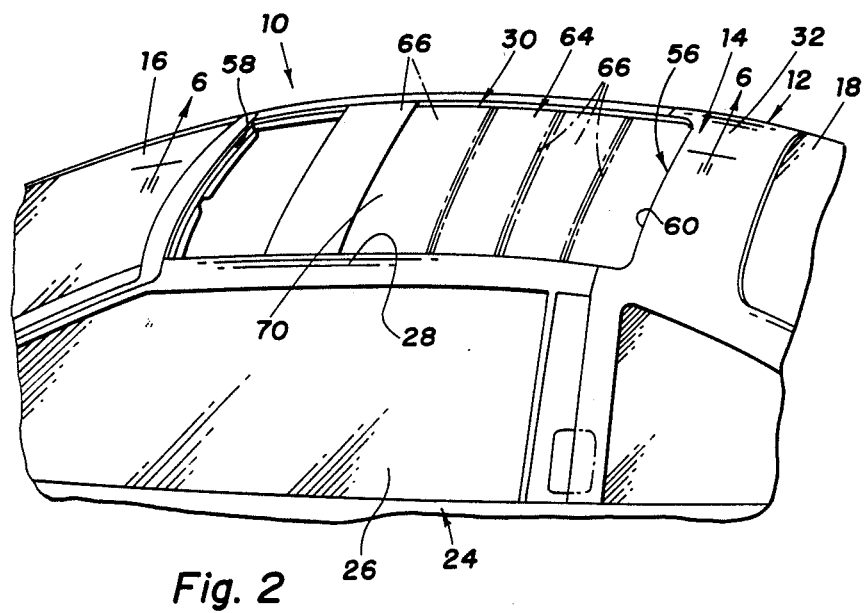
FIG. 2 is a partial perspective view of the vehicle body showing the sunroof in a partially open position.

With reference to FIGS. 1 and 2, a vehicle generally indicated by 10 is disclosed as including a vehicle body 12 whose roof 14 is conventionally located to the rear of the windshield 16 and forward of the rear window 18 in a conventional manner. The windshield 16 shown in FIG. 2 is located to the rear of the front engine compartment lid 20 shown in FIG. 1, and the rear window 18 is located forwardly from the rear storage compartment lid 22 in a conventional fashion. At each lateral side of the vehicle, the vehicle body 12 includes an associated side door 24 having a window 26 that is movable vertically between open and closed positions in a conventional manner. Each of the side doors 24 is disclosed as having a window frame 28 that extends around the front, top, and rear sides of the window 26 in the closed position illustrated. A sunrof assembly 30 according to the present invention is illustrated in FIG. 1 in a closed position and in FIG. 2 in a partially open position as is hereinafter more fully described. It should be appreciated that this sunroof assembly 30 can also be utilized with a vehicle body whose side doors include frameless windows as well as the framed windows shown. However, the invention has particular utility with framed side door windows for reasons hereinafter described.

With reference to FIG. 3, the vehicle body 12 in which the sunroof assembly is installed has its roof 14 provided by an outer roof panel 32 having side edges 34 located adjacent the upper door edges provided by the window frames 28. A pair of inner rails 36 of the roof 14 cooperate with the roof panel side edges 34 to provide hollow side rails 38 at each lateral side of the roof. Each inner side rail 36 includes inboard and outboard rail members 40 and 42 which have a flanged connection 44 secured by spot welding and covered by a trim strip 46. The outboard side rail 42 also has a flanged connection 48 that is secured by a rivet 50 and which supports a seal 52 that is engaged by the upper side door edge provided by the window frame 28. Between the side doors, the roof 14 also includes an inner headliner 54 that is secured by the trim strips 46 and other conventional attachments to the roof 14.

Sunroof assembly 30 illustrated in FIGS. 1 and 2 is installed by initially providing an opening 56 in the outer roof panel 32. This opening 56 is provided by cutting the roof panel 32 laterally to provide front and rear edges 58 and 60 of the opening and, as shown in FIG. 4, by completely removing the roof panel between the rail members 42 to expose the interior of the side rails 38.

As shown by continuing reference to FIG. 4, the sunroof assembly 30 included a pair of tracks 62 one of which is mounted within one of the side rails 38 and the other of which is mounted within the other side rail 38 as is hereinafter more fully described.

Sunroof assembly 30 includes a sunroof 64 having a plurality of panels 66 with elongated shapes extending laterally with respect to the vehicle body as best illustrated in FIGS. 1 and 2. As shown in FIG. 4, each panel 66 has opposite ends 68 one of which is mounted by one track 62 in one of the side rails 38 and the other of which is mounted by the other track 62 in the other side rail 38. The tracks 62 cooperate to mount the panels 66 for forward and rearward movement with respect to the vehicle body. The opposite panel ends 68 are positioned generally adjacent the upper side door edges provided by the window frames 28 of the closed side doors 24 to thereby provide a generally door-to-door construction. The sunroof assembly has particular utility with the type of vehicle illustrated where the door window frames 28 continue the contour of the roof 14, as shown in FIGS. 3 and 4, since the side rails 38 of this type of vehicle extend in an inboard direction a greater extent than with other type vehicles and conventional sunroofs, which must be located between the side rails, thus cannot have a very great lateral dimension in comparison to the door-to-door construction. However, it should be appreciated that the sunroof assembly of this invention can also be utilized with other types of vehicles, such as vehicles with unframed side door windows, even though it does have particular utility with vehicles having side door window frames that continue the roof contour as previously mentioned.

As shown in FIGS. 4–7, the sunroof 64 also includes a flexible sheet-like cover 70 that extends between the panel 66 and has connections 72 to the panel. Cover 70 is most preferably made from a resin impregnated cloth so as to have strength as well as being resistant to deterioration from moisture and the sun. Connections 72 are most preferably provided by an adhesive bond between the lower surface of the cover 70 and the rearward extremities of the panels 66. These connections are spaced along the cover with greater spacings than the front-to-rear dimensions of the panels as best shown in FIG. 5. Sunroof 64 is movable either manually or by a power actuator between the closed position of FIG. 5, the partially open position of FIG. 6, and the fully open position of FIG. 7. In the closed position of FIG. 5, the panels 66 are spaced from each other with the cover 70 extending therebetween to define the contour of the roof. In the open position of FIG. 7, the sunroof panels 66 are positioned adjacent the rear edge 56 of the roof opening in a partially overlapping relationship with the cover 70 stored therebetween in a folded relationship.

As illustrated in FIG. 7, the sunroof 64 has its panels 66 partially overlapping each other less than completely in the open position with respect to the roof opening 56. This partial overlapping is accomplished by providing the opposite ends 68 of the sunroof panel 66 each with a front side 74 having a front support 76 mounted by the associated track 62 within the adjacent roof side rail. Each sunroof panel 66 also includes a rear side 78 that is located rearwardly of its track mounted front supports 76. In the stored position of FIG. 7, the folded cover 70 extends from the connection 72 at the rear side 78 of each panel forwardly below that panel and is then folded downwardly and back rearwardly so as to extend to the connection 72 at the rear side 78 of the next rearward panel. Upon forward movement of the sunroof 64 from the stored open position of FIG. 7 through the partially closed position of FIG. 6 to the fully closed position of FIG. 5, the cover 70 unfolds as the panels 66 move away from each other to the spaced relationship where the cover fully closes the roof opening 56. In this fully closed position, a seal 80 on the front side 74 of the forwardmost panel 66 engages the windshield header 82 to provide sealing of the closure at the upper extremity of the windshield 16.

As best illustrated in FIG. 7, each track 62 includes a plurality of inclined ramps 84 and horizontally extending portions 86 connecting the ramps. The number of ramps 84 of each track 62 is one less than the number of sunroof panels 66. Each of the ramps 84 extends downwardly in a forward direction such that the rear side 78 of each panel 66 is moved upwardly as the front support 76 thereof moves along the ramps to thereby facilitate the overlapping storage of the sunroof panels in the open position as well as facilitating the folding of the cover 70 between the panels as shown in FIG. 6.

As illustrated in FIG. 4, each track 62 has inboard and outboard flanges 88 and 90 secured to the associated roof side rail 38 preferably by rivets 92 and 94. Each track 62 also includes a track portion 96 located laterally intermediate its inboard and outboard flanges 88 and 90 to provide support for the opposite ends 68 of the sunroof panels 66. The track portion 96 of each track 62 preferably projects upwardly and has a track groove 98. Each opposite end 68 of each sunroof panel 62 has at least one support element 100 received by the track portion groove 98 of the associated track 62 to provide mounting thereof on the track. As illustrated, each track portion 96 has its groove 98 provided with a horizontally opening configuration. Each sunroof panel end 68 preferably has its front support 76 provided with a downwardly projecting construction on which its support element 100 is mounted. As illustrated, the support elements 100 are rollers that are supported by pins 102 and each panel end 68 has two of such roller support elements 100 supported by a pair of the pins 102. It should be appreciated that it is also possible to utilize slides instead of the rollers even though it is preferable to utilize the rollers in order to reduce friction and the consequent total effort required to move the sunroof between the closed and open positions.

As shown by continuing reference to FIG. 4, the groove 98 of each track 62 opens in an inboard direction with respect to the vehicle body with each pin 102 extending generally horizontally into the groove to support its roller element 100. Each track 62 also includes an upwardly projecting guide 104 that opposes the horizontally opening groove 98 with the downwardly projecting front support 76 of the associated panel end therebetween in a captured relationship.

As shown in FIGS. 5–7, each track 62 includes at least one water outlet 106 and preferably has at least one end 108 at which the outlet is located. Most preferably, each track 62 has front and rear outlets 106 and 110 respectively located at front and rear ends 108 and 112 of the track.

While the best mode for carrying out the invention has been described in detail, those familiar with the art to which this invention relates will recognize various alternative designs and embodiments for carrying out the invention as defined by the following claims.

What is claimed is:

1. In a vehicle body including an outer roof panel having side edges and also having inner rails that cooperate with the side edges of the outer roof panel to provide a pair of hollow side rails, and side doors having upper edges located adjacent the side edges of the outer roof panel, a sunroof assembly comprising: a roof opening in the outer roof panel; said roof opening having forward and rearward edges and having side edges exposing the interior of the side rails of the roof; a pair of tracks each of which includes a plurality of inclined ramps and horizontally extending portions connecting the ramps; each ramp extending downwardly in a forward direction; one of the tracks being mounted within one of the side rails and the other track being mounted within the other side rail; a sunroof including a plurality of panels having elongated shapes extending laterally with respect to the vehicle body; each panel having opposite ends one of which has a front support mounted by one track in one of the side rails and the other of which has a front support mounted by the other track in the other side rail; said tracks cooperating to support the panels for forward and rearward movement with respect to the vehicle body; said panel ends being located generally adjacent the upper edges of the closed side doors to provide a generally continuous door-to-door construction; said sunroof also including a flexible sheet-like cover that extends between the panels and has connections to the panels; said connections to adjacent panels being spaced along the cover with greater spacings than the front-to-rear dimensions of the panels; and said sunroof being movable between a closed position with respect to the roof opening where the panels are spaced from each other with the cover extending therebetween and an open position where the panels are positioned adjacent the rear edge of the roof opening in a partially overlapping relationship with the cover stored therebetween in a folded condition.

2. A sunroof assembly as in claim 1 wherein each track has inboard and outboard flanges secured to the associated roof side rail, and each track having a track portion located laterally intermediate its inboard and outboard flanges.

3. A sunroof assembly as in claim 1 wherein track has a track portion that projects upwardly and has a track groove, and each opposite end of each sunroof panel having the front support thereof including a support element received by the track portion groove of the associated track to provide mounting thereof on the track.

4. A sunroof assembly as in claim 3 wherein each track portion has its groove provided with a horizontally opening configuration.

5. A sunroof assembly as in claim 4 wherein the support elements of the sunroof panels are rollers.

6. A sunroof assembly as in claim 4 wherein the groove of each track portion opens in an inboard direction with respect to the vehicle body.

7. A sunroof assembly as in claim 4 wherein each track includes an upwardly projecting guide that opposes the horizontally opening groove with the downwardly projecting front support of the associated panel end therebetween in a captured relationship.

8. A sunroof assembly as in claim 3 wherein each track has at least one water outlet.

9. A sunroof assembly as in claim 8 wherein each track has at least one end at which its water outlet is located.

10. A sunroof assembly as in claim 9 wherein each track has front and rear ends that each have an associated water outlet.

11. In a vehicle body including an outer roof panel having side edges and also having inner rails that cooperate with the side edges of the outer roof panel to provide a pair of hollow side rails, and side doors having upper edges located adjacent the side edges of the outer roof panel, a sunroof assembly comprising: a roof opening in the outer roof panel; said roof opening having forward and rearward edges and having side edges exposing the interior of the side rails of the roof; a pair of tracks each of which includes a plurality of inclined ramps and horizontally extending portions connecting the ramps; each ramp extending downwardly in a forward direction; one of the tracks being mounted within one of the side rails and the other track being mounted within the other side rail; each track including a track portion having a groove; a sunroof including a plurally of panels having elongated shapes extending laterally with respect to the vehicle body; each panel having opposite ends one of which has a front support having a support element received by the track portion groove of one track in one of the side rails and the other of which has a front support having a support element received by the track portion groove of the other track in the other side rail; said tracks cooperating with the support elements to support the panels for forward and rearward movement with respect to the vehicle body; said panel ends being located generally adjacent the upper edges of the closed side doors to provide a generally continuous door-to-door construction; said sunroof also including a flexible sheet-like cover that extends between the panels and has connections to the panels; said connections to adjacent panels being spaced along the cover with greater spacings that the front-to-rear dimensions of the panels; and said sunroof being movable between a closed position with respect to the roof opening where the panels are spaced from each other with the cover extending therebetween and an open position where the panels are positioned adjacent the rear edge of the roof opening in a partially overlapping relationship with the cover stored therebetween in a folded condition.

12. In a vehicle body including an outer roof panel having side edges and also having inner rails that cooperate with the side edges of the outer roof panel to provide a pair of hollow side rails, and side doors having upper edges located adjacent the side edges of the outer roof panel, a sunroof assembly comprising: a roof opening in the outer roof panel; said roof opening having forward and rearward edges and having side edges exposing the interior of the side rails of the roof; a pair of tracks each of which includes a plurality of inclined ramps and horizontally extending portions connecting the ramps; each ramp extending downwardly in a forward direction; one of the tracks being mounted within one of the side rails and the other track being mounted within the other side rail; a sunroof including a plurality of panels having elongated shapes with front and rear sides extending laterally with respect to the vehicle body; each panel having opposite ends of which has a downwardly projecting front support mounted by one track in one of the side rails and the other of which has a downwardly projecting front support mounted by the other track in the other side rail; said tracks cooperating to support the panels for forward and rearward movement with respect to the vehicle body; said panel ends being located generally adjacent the upper edges of the closed side doors to provide a generally continuous door-to-door construction; said sunroof also including a flexible sheet-like cover that extends between the panels and has connections to the rear sides of the panels; said connections to adjacent panels being spaced along the cover with greater spacings than the front-to-rear dimensions of the panels; and said sunroof being movable between a closed position with respect to the roof opening where the panels are spaced from each other with the cover extending therebetween and an open position where the panels are positioned adjacent the rear edge of the roof opening in a partially overlapping relationship with the cover stored therebetween in a folded condition.

13. In a vehicle body including an outer roof panel having side edges and also having inner rails that cooperate with the side edges of the outer roof panel to provide a pair of hollow side rails, and side doors having upper edges located adjacent the side edges of the outer roof panel, a sunroof assembly comprising: a roof opening in the outer roof panel; said roof opening having forward and rearward edges and having side edges exposing the interior of the side rails of the roof; a pair of tracks each of which includes a plurality of inclined ramps and horizontally extending portions connecting the ramps; each ramp extending downwardly in a forward direction; one of the tracks being mounted within one of the side rails and the other track being mounted within the other side rail; each track having inboard and outboard flanges mounted on the associated side rail and having an upwardly projecting track portion located between its flanges; the track portion of each track having a track groove that opens in an inboard direction; a sunroof including a plurality of panels having elongated shapes with front and rear sides extending laterally with respect to the vehicle body; each panel having opposite ends one of which has a downwardly projecting front support including a support element received within the track portion groove of one track in one of the side rails and the other of which has a downwardly projecting front support including a support element received within the track portion groove of the other track in the other side rail; said tracks cooperating to support the panels for forward and rearward movement with respect to the vehicle body; said panel ends being located generally adjacent the upper edges of the closed side doors to provide a generally continuous door-to-door construction; said sunroof also including a flexible sheet-like cover that extends between the panels and has connections to the rear sides of the panels; said connections to adjacent panels being spaced along the cover with greater spacings than the front-to-rear dimensions of the panels; and said sunroof being movable between a closed position with respect to the roof opening where the panels are spaced from each other with the cover extending therebetween and an open position where the panels are positioned adjacent the rear edge of the roof opening in a partially overlapping relationship with the cover stored therebetween in a folded condition.

* * * * *

UNITED STATES PATENT AND TRADEMARK OFFICE
CERTIFICATE OF CORRECTION

PATENT NO. : 4,893,868

DATED : January 16, 1990

INVENTOR(S) : William D. Miller et al

It is certified that error appears in the above-identified patent and that said Letters Patent is hereby corrected as shown below:

Column 8, Line 2, Claim 11

"plurally" should be --plurality--.

Column 8, Line 45, Claim 12 after "ends" insert --one--.

Signed and Sealed this

Fourteenth Day of May, 1991

*Attest:*

HARRY F. MANBECK, JR.

*Attesting Officer*      *Commissioner of Patents and Trademarks*